(12) United States Patent
Jia et al.

(10) Patent No.: US 11,282,177 B2
(45) Date of Patent: Mar. 22, 2022

(54) MOIRE QUANTITATIVE EVALUATION METHOD AND DEVICE, ELECTRONIC DEVICE, STORAGE MEDIUM

(71) Applicant: BOE TECHNOLOGY GROUP CO., LTD., Beijing (CN)

(72) Inventors: Qian Jia, Beijing (CN); Jaegeon You, Beijing (CN); Xinxing Wang, Beijing (CN); Yingtao Wang, Beijing (CN); Xuefei Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 58 days.

(21) Appl. No.: 16/841,013

(22) Filed: Apr. 6, 2020

(65) Prior Publication Data

US 2021/0158497 A1 May 27, 2021

(30) Foreign Application Priority Data

Nov. 27, 2019 (CN) .......................... 201911183634.4

(51) Int. Cl.
*G06T 5/50* (2006.01)
*G06T 5/00* (2006.01)
(Continued)

(52) U.S. Cl.
CPC ................ *G06T 5/50* (2013.01); *G06T 5/007* (2013.01); *G06T 5/10* (2013.01); *H04N 1/6016* (2013.01);
(Continued)

(58) Field of Classification Search
CPC .. G06T 5/50; G06T 5/007; G06T 5/10; G06T 2207/10024; G06T 2207/30168;
(Continued)

(56) References Cited

U.S. PATENT DOCUMENTS

2019/0072897 A1\* 3/2019 Jepsen ................. G03H 1/0465

FOREIGN PATENT DOCUMENTS

| CA | 2713312 C | \* | 10/2018 | ............. F16H 21/14 |
| CN | 101263417 A | \* | 9/2008 | ........... G09G 3/3406 |

(Continued)

*Primary Examiner* — Matthew C Bella
*Assistant Examiner* — Kathleen M Broughton
(74) *Attorney, Agent, or Firm* — Thomas Horstemeyer, LLP

(57) ABSTRACT

The present disclosure relates to a moire quantitative evaluation method. The method includes obtaining an image of a first pattern layer; obtaining coordinates of each of the first image units; according to the coordinates of each of the first image units and a thickness and a refractive index of a dielectric layer, determining coordinates of projection image units each of which corresponds to a corresponding one of the first image units along an oblique view light path; determining a pixel value of each of the projection image units according to pixel values of second image units in each of the surrounding regions to obtain an oblique view image; superimposing the image of the first pattern layer and the oblique view image to obtain a first superimposed image; converting the first superimposed image into a moire image; and performing a moire quantitative evaluation according to the moire image.

16 Claims, 9 Drawing Sheets

(51) Int. Cl.
*G06T 5/10* (2006.01)
*H04N 1/60* (2006.01)

(52) U.S. Cl.
CPC ............... *G05B 2219/37131* (2013.01); *G06T 2207/10024* (2013.01)

(58) Field of Classification Search
CPC ....... G06T 7/97; G06T 7/0002; H04N 1/6016; G09G 2320/066; G09G 2320/0242; G09G 2300/0469; G09G 3/006
See application file for complete search history.

(56) References Cited

FOREIGN PATENT DOCUMENTS

| | | | | | |
|---|---|---|---|---|---|
| CN | 109690890 | A | * | 4/2019 | ............. H01S 5/183 |
| JP | 3617887 | B2 | * | 2/2005 | ........... H04N 9/0451 |
| JP | 2017507373 | A | * | 3/2017 | ........... G02B 6/0053 |
| WO | WO-2012089849 | A1 | * | 7/2012 | ............... G09G 3/20 |

* cited by examiner

MOIRE QUANTITATIVE EVALUATION METHOD AND DEVICE, ELECTRONIC DEVICE, STORAGE MEDIUM

CROSS-REFERENCE TO RELATED APPLICATION

This application claims the benefit of and priority to Chinese Patent Application No. 201911183634.4 filed on Nov. 27, 2019, the contents of which being incorporated by reference in their entirety herein.

TECHNICAL FIELD

The present disclosure relates to the display technologies and, in particular, to a moire quantitative evaluation method and device, an electronic device, and a storage medium.

BACKGROUND

In a display device, there are usually multiple periodic structures, such as a black matrix layer, a prism film layer, or a touch layer. In a liquid crystal display device, after the light from the backlight module passes through two layers with periodic structure, moire (e.g., image interference) appears on the display device. In order to ensure the display effect of the display device, quantitatively evaluating moire in the design stage is needed.

It should be noted that the information disclosed in the Background section above is only for enhancing the understanding of the background of the present disclosure and thus, may include information that does not constitute prior art known to those of ordinary skill in the art.

SUMMARY

According to a first aspect of embodiments of the present disclosure, a moire quantitative evaluation method is provided, including:

obtaining an image of a first pattern layer, wherein the first pattern layer is located on a light-exiting side of a second pattern layer, the first pattern layer comprises first image units arranged periodically, and the second pattern layer comprises second image units arranged periodically;

obtaining coordinates of each of the first image units according to a viewing distance and an oblique viewing angle;

according to the coordinates of each of the first image units and a thickness and a refractive index of a dielectric layer disposed between the first pattern layer and the second pattern layer, determining coordinates of projection image units on the second pattern layer each of which corresponds to a corresponding one of the first image units along an oblique view light path;

determining surrounding regions on the second pattern layer each of which surrounds one of the projection image units, and determining a pixel value of each of the projection image units according to pixel values of second image units in each of the surrounding regions to obtain an oblique view image;

superimposing the image of the first pattern layer and the oblique view image to obtain a first superimposed image;

converting the first superimposed image into a moire image; and performing a moire quantitative evaluation according to the moire image.

According to a second aspect of embodiments of the present disclosure, a moire quantitative evaluation device is provided, including:

an obtaining circuit configured to obtain an image of a first pattern layer, wherein the first pattern layer is located on a light-exiting side of a second pattern layer, the first pattern layer comprises first image units arranged periodically, and the second pattern layer comprises second image units arranged periodically;

a coordinate obtaining circuit configured to obtain coordinates of each of the first image units according to a viewing distance and an oblique viewing angle;

a first determination circuit configured to, according to the coordinates of each of the first image units and a thickness and a refractive index of a dielectric layer disposed between the first pattern layer and the second pattern layer, determine coordinates of projection image units on the second pattern layer each of which corresponds to a corresponding one of the first image units along an oblique view light path;

a second determination circuit configured to determine surrounding regions on the second pattern layer each of which surrounds one of the projection image units, and determining a pixel value of each of the projection image units according to pixel values of second image units in each of the surrounding regions to obtain an oblique view image;

a superimposing circuit configured to superimpose the image of the first pattern layer and the oblique view image to obtain a first superimposed image;

a converting circuit configured to convert the first superimposed image into a moire image; and an evaluation circuit configured to perform a moire quantitative evaluation according to the moire image.

According to a third aspect of embodiments of the present disclosure, an electronic device is provided, including:

at least one hardware processor; and a memory for storing computer-readable instructions;

wherein, when the computer-readable instructions are executed by the at least one hardware processor, the processor is directed to implement the method described above.

According to a fourth aspect of embodiments of the present disclosure, a non-transitory computer-readable storage medium is provided having stored thereon a computer program, which when executed by at least one hardware processor, causes the at least one hardware processor to implement the method described above.

It should be understood that the above general description and the following detailed description are merely exemplary, and should not be considered as limiting the present disclosure.

BRIEF DESCRIPTION OF THE DRAWINGS

The above and other features and advantages of the present disclosure will become more apparent through the detailed description of exemplary embodiments thereof with reference to the accompanying drawings.

DETAILED DESCRIPTION

Figure 1:
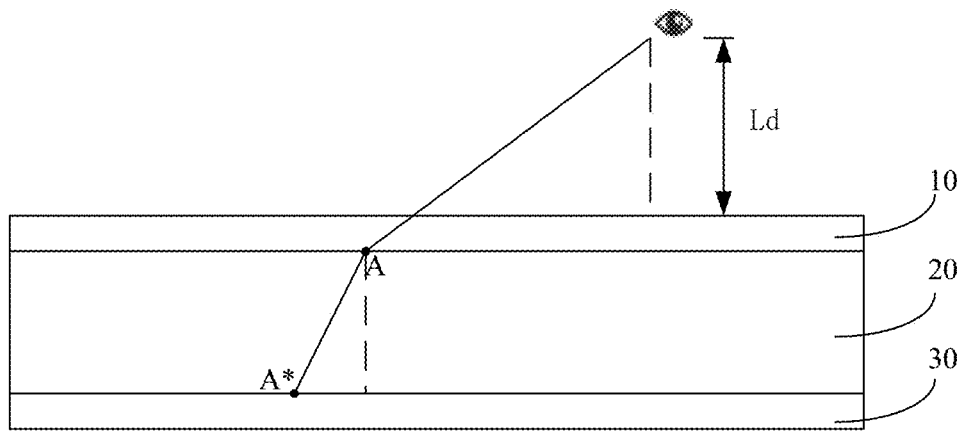
FIG. 1 is a schematic diagram showing an equivalent light path from an oblique viewing angle according to an exemplary embodiment of the present disclosure.

Example embodiments will now be described more fully with reference to the accompanying drawings. However, the exemplary embodiments may be embodied in many forms and should not be construed as limited to the method of implementation set forth herein. Rather, these embodiments are provided so that this disclosure will be thorough and complete, and will fully convey the concept of the exemplary embodiments to those skilled in the art. The same reference numerals in the drawings represent the same or similar parts, so the repeated description thereof will be omitted.

Furthermore, the described features, structures, or characteristics may be combined in any suitable manner in one or more embodiments. In the following description, numerous specific details are given to provide a thorough understanding of embodiments of the present disclosure. Those skilled in the art will realize that the technical solutions of the present disclosure may be practiced without one or more of the specific details, or other methods, components, materials, apparatus, steps, etc. may be utilized. In other instances, well-known structures, methods, device, implementations, materials, or operations are not shown or described in detail to avoid obscuring respective aspects of the present disclosure.

The block diagrams shown in the accompanying drawings are merely functional entities and do not necessarily correspond to physically separate entities. That is, these functional entities may be implemented in the form of software, or implemented in one or more software-hardened modules completely or partially, or in different networks and/or processor devices and/or microcontroller devices.

Existing moire evaluation methods mainly evaluate moire from an orthographic viewing angle, and cannot evaluate moire of a display device from an oblique viewing angle.

A display device may include multiple layers with periodic structures, and with a dielectric layer may be disposed between two layers of periodic structures. FIG. 1 shows a path of light entering the human eye from an oblique viewing angle. The light enters the air through the dielectric layer 20 and is refracted. As viewed from an oblique viewing angle, the point on the second pattern layer 30 which corresponds to the point A on the first pattern layer 10 along the optical path is A*. The first pattern layer includes first image units that are periodically arranged. In practical applications, regions on the second pattern layer which correspond to the first image units along the optical path from an oblique viewing angle may be determined.

The display device may be a touch display device, a prism film laminated display device, a dual cell display device, an augment reality (AR) or virtual reality (VR) product, or the like.

Figure 2:
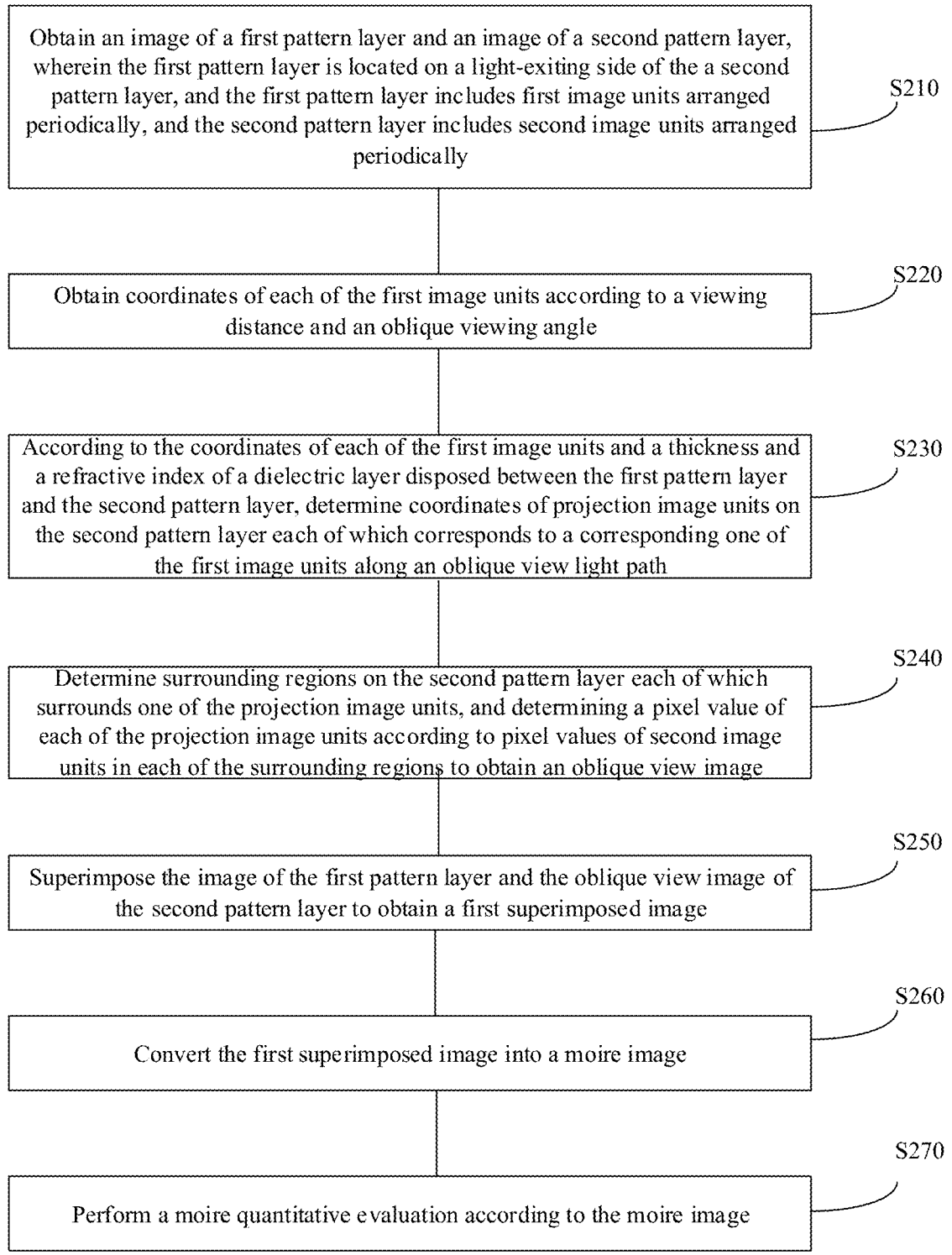
FIG. 2 is a flowchart of a moire quantitative evaluation method according to an exemplary embodiment of the present disclosure.

An exemplary embodiment of the present disclosure provides a moire quantitative evaluation method. As shown in FIG. 2, the method includes the following steps:

In step S210, an image of a first pattern layer is obtained. The first pattern layer is located on a light-exiting side of a second pattern layer, where the first pattern layer comprises first image units arranged periodically and the second pattern layer comprises second image units arranged periodically.

In step S220, coordinates of each of the first image units are obtained according to a viewing distance and an oblique viewing angle.

In step S230, according to the coordinates of each of the first image units and a thickness and a refractive index of a dielectric layer disposed between the first pattern layer and the second pattern layer, coordinates of projection image units on the second pattern layer each of which corresponds to a corresponding one of the first image units along an oblique view light path are determined.

In step S240, surrounding regions on the second pattern layer each of which surrounds one of the projection image units are determined, and a pixel value of each of the projection image units is determined according to pixel values of second image units in each of the surrounding regions to obtain an oblique view image.

In step S250, the image of the first pattern layer and the oblique view image are superimposed to obtain a first superimposed image.

In step S260, the first superimposed image is converted into a moire image.

In step S270, a moire quantitative evaluation is performed according to the moire image.

In the moire quantitative evaluation method according to the embodiment of the present disclosure, according to the coordinates of each of the first image units and a thickness and a refractive index of a dielectric layer disposed between the first pattern layer and the second pattern layer, coordinates of projection image units on the second pattern layer each of which corresponds to a corresponding one of the first image units along an oblique view light path are determined. Then, surrounding regions on the second pattern layer each of which surrounds one of the projection image units are determined, and a pixel value of each of the projection image units is determined according to pixel values of second image units in each of the surrounding regions to obtain an oblique view image. The image of the first pattern layer and the oblique view image are superimposed to obtain a first superimposed image, the first superimposed image is converted to a moire image, and a moire quantitative evaluation is performed according to the moire image.

That is to say, in the moire quantitative evaluation method according to the embodiment of the present disclosure, coordinates of the projection image units are determined according to the coordinates of the first image units and the thickness and refractive index of the dielectric layer disposed between the first pattern layer and the second pattern layer, the method for obtaining the coordinates is simple and involves in relatively small amount of calculations, and there is no need to perform complicated three-dimensional coordinate calculation.

Steps of the method for quantitatively evaluating moire according to embodiments of the present disclosure will be described in detail below.

In step S210, an image of a first pattern layer is obtained. The first pattern layer is located on a light-exiting side of a second pattern layer, the first pattern layer comprises first image units arranged periodically, and the second pattern layer comprises second image units arranged periodically.

The first pattern layer and the second pattern layer are layers having periodic image units in a display device. In the display device, the first pattern layer is located on a light-exiting side of the second pattern layer. There is at least one dielectric layer between the first pattern layer and the second pattern layer.

For example, the first pattern layer may be a black matrix layer, and the second pattern layer may be a stacked prism film layer. Alternatively, the first pattern layer may be a touch layer, and the second pattern layer may be a black matrix layer. Alternatively, the pattern layer may be one of a black matrix layer, a touch layer, and a grating layer. For example, the first pattern layer is a film layer located on a side of the second pattern layer away from the backlight module. If the first pattern layer is a black matrix layer, the first image units may be pixel units. If the second pattern layer is a stacked prism film layer, the image of the second pattern layer may be described by the contrast of the sine function of the prism film.

In step S220, coordinates of each of the first image units are obtained according to a viewing distance and an oblique viewing angle.

For example, as shown in FIG. 1, the vertical distance Ld from a human eye to the first pattern layer 10 may be considered as a viewing distance. The human eye may view the display device in an oblique viewing angle, and specific value of the oblique viewing angle may be determined depending on actual situations. According to the viewing distance and the oblique viewing angle, the coordinates of the point A (representing a first image unit) in a first coordinate system may be determined. The first coordinate system may be coordinate system with the projection point of the viewing point on the display device as the origin.

In step S230, according to the coordinates of each of the first image units and a thickness and a refractive index of a dielectric layer disposed between the first pattern layer and the second pattern layer, coordinates of projection image units on the second pattern layer each of which corresponds to a corresponding one of the first image units along an oblique view light path are determined.

A dielectric layer is provided between the first pattern layer and the second pattern layer. The region on the second pattern layer which corresponds to a first image unit in the first pattern layer images along the optical path from an oblique viewing angle is not the orthographic projection of the first image unit. According to the coordinates of each of the first image units and a thickness and a refractive index of the dielectric layer disposed between the first pattern layer and the second pattern layer, coordinates of projection image units on the second pattern layer each of which corresponds to a corresponding one of the first image units along an oblique view light path can be determined.

Figure 4:
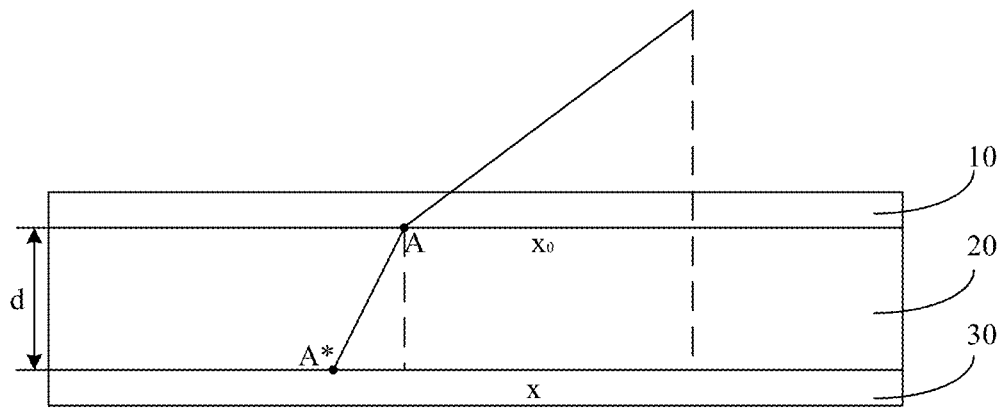
FIG. 4 is a schematic diagram showing an equivalent light path from an oblique viewing angle according to an exemplary embodiment of the present disclosure.

In the following description, for example, the first pattern layer is the black matrix layer and the second pattern layer is the stacked prism film layer. As shown in FIG. 4, in the current oblique viewing angle, point A in the image of the first pattern layer corresponds to point A* on the second pattern layer. In other words, the point A* is the projection point on the second pattern layer which corresponds to the point A along the oblique view light path. The distance between the first pattern layer and the second pattern layer is d, that is, the thickness of the dielectric layer is d. The refractive index of the dielectric layer is n. Taking the projection point of the viewing point on the display device as the origin of coordinates, the coordinates of point A may be calculated by using the viewing distance and the viewing angle, and the coordinates of point A may be represented as $A(x_0, y_0)$. When light passes through the dielectric layer, the scaling factor in the x direction is xscale, and the scaling factor in the y direction is yscale. On this basis, the coordinates of A* are represented as $A^*(x, y)$, where:

$$\begin{bmatrix} x \\ y \end{bmatrix} = \begin{bmatrix} 1 + xscale & 0 \\ 0 & 1 + yscale \end{bmatrix} \begin{bmatrix} x_0 \\ y_0 \end{bmatrix} \tag{1}$$

According to the law of refraction, the following equations may be obtained:

$$xscale = \frac{d}{\sqrt{(n^2 - 1)x_0^2 + n^2 d^2}} \tag{2}$$

$$yscale = \frac{d}{\sqrt{(n^2 - 1)y_0^2 + n^2 d^2}}$$

In the foregoing exemplary embodiment, there is one dielectric layer disposed between the first and second pattern layers. In practical applications, there may be a plurality of pattern layers between the first pattern layer and the second pattern layer, and the calculation method is similar to that in the above embodiment, embodiments of the present disclosure do not impose specific limitations on this.

The coordinates of the projection image units on the second pattern layer which correspond to the first image units may be determined according to the above formula.

In step S240, surrounding regions on the second pattern layer each of which surrounds one of the projection image units are determined, and a pixel value of each of the projection image units is determined according to pixel values of second image units in each of the surrounding regions to obtain an oblique view image.

Figure 3:
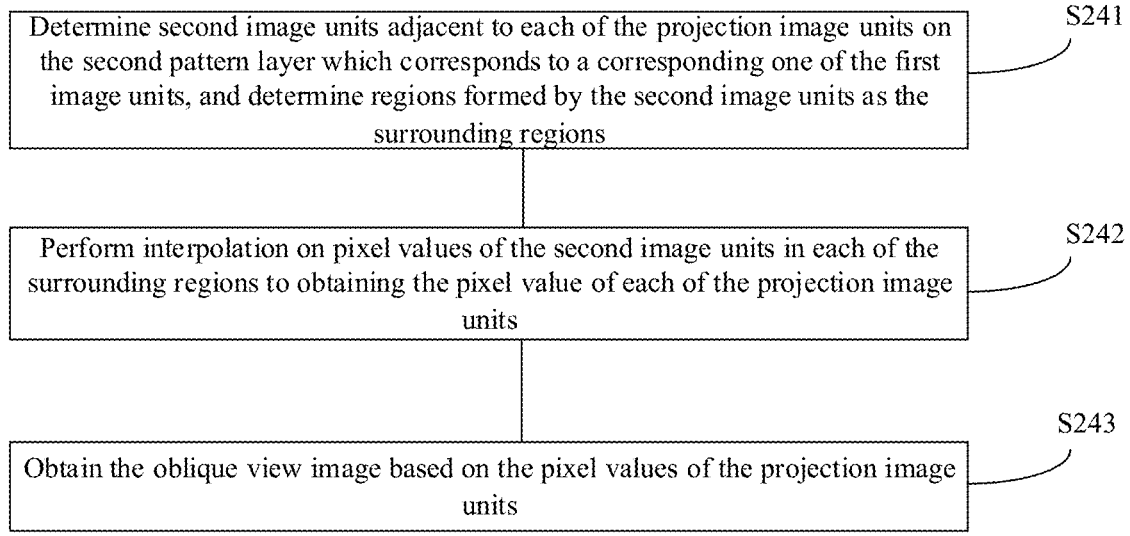
FIG. 3 is a flowchart of a moire quantitative evaluation method according to an exemplary embodiment of the present disclosure.

In an exemplary embodiment, as shown in FIG. 3, step S240 may include the following steps:

In step S241, second image units adjacent to each of the projection image units on the second pattern layer which corresponds to a corresponding one of the first image units are determined, and regions formed by the second image units are determined as the surrounding regions.

In step S242, interpolation is performed on pixel values of the second image units in each of the surrounding regions to obtaining the pixel value of each of the projection image units.

In step S243, the oblique view image is obtained based on the pixel values of the projection image units.

According to an exemplary embodiment, step S242 may include determining distances of each of the projection image units from edges of a surrounding region which corresponds to the projection image unit, and performing interpolation on pixel values of the second image units in the surrounding region based on the distances to obtain the pixel value of each of the projection image units.

Figure 5:
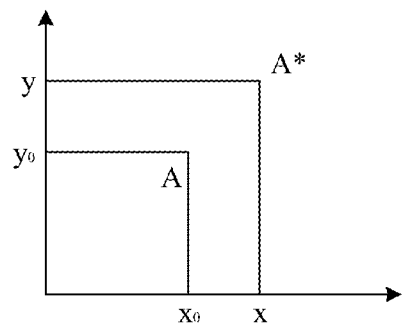
FIG. 5 is a schematic diagram of coordinates according to an exemplary embodiment of the present disclosure.
Figure 6:
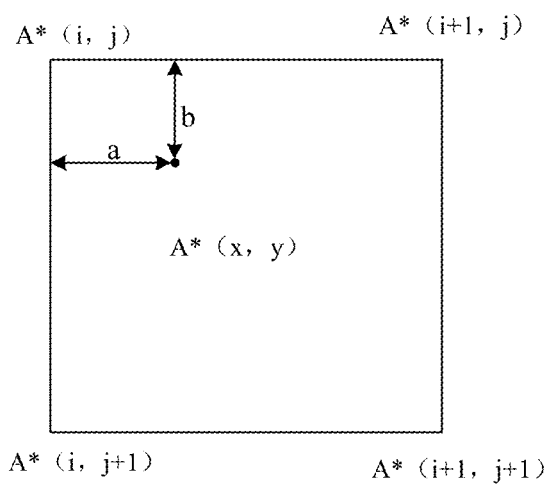
FIG. 6 is a schematic diagram of pixel distribution of a second pattern layer according to an exemplary embodiment of the present disclosure.

There are multiple periodically arranged pixels on the image of second pattern layer, and the pixel values such as the grayscale values of the pixels are known. In practical applications, there may be multiple second pixels on the second pattern layer around each projection image unit which corresponds to a corresponding one of the first image units. As shown in FIGS. 5 and 6, there are four pixels, namely $A^*(i, j)$, $A^*(i+1, j)$, $A^*(i, j+1)$ and $A^*(i+1, j+1)$, around the projection point $A^*(x, y)$ on the second pattern layer which corresponds to the point A. These four points are located at the four vertices of a 1×1 square. The distances between $A^*(x, y)$ and two edges originated from the vertex of $A^*(i, j)$ is a and b, respectively. The pixel value $HA^*(x, y)$ of $A^*(x, y)$ may be calculated by interpolation as follows (for example, the pixel value may be represented by grayscale value):

$$HA^*(x,y)=(1-a)(1-b)HA^*(i,j)+a(1-b)HA^*(i+1,j)+abHA^*(i+1,j+1)+(1-a)bHA^*(i,j+1) \quad (3)$$

The oblique view image may be obtained based on the pixel values of the projection image units.

In embodiments of the present disclosure, the coordinates of the projection image units may be obtained according to the coordinates of each of the first image units and a thickness and a refractive index of a dielectric layer disposed between the first pattern layer and the second pattern layer, for example, using the above equations (1) and (2). In such manner for obtaining the coordinates, the coordinates in the X and Y directions are calculated individually, and such manner involves in two-dimensional coordinate calculation, and there is no need to perform complicated three-dimensional coordinate calculation, thereby converting a three-dimensional issue into a two-dimensional issue. The method is simple and the calculation efficiency is high. After the coordinates of the projection image units are obtained, interpolation may be performed on known pixel values of second image units around each projection image unit so as to obtain the oblique view image.

In practical applications, the number of pixels around the point $A^*$ may be more or less than that shown in FIG. 5 or 6, and the drawings formed by the pixels may also be other shapes and sizes. Bilinear interpolation or cubic spline interpolation may also be used, and embodiments of the present disclosure do not impose specific limitations on this.

In exemplary embodiments of the present disclosure, the pixel unit refers to a pixel unit defined by a black matrix in a display device. The pixels are pixels in the image of the first pattern layer and the image of the second pattern layer.

In step S250, the image of the first pattern layer and the oblique view image are superimposed to obtain a first superimposed image.

For example, the oblique view image is converted to a grayscale image, image data of the converted grayscale image and image data of the image of the first pattern layer are multiplied to obtain the first superimposed image.

For example, the oblique view image obtained above is converted into a grayscale image, which may be represented as Grayprism. Then, Grayprism and each channel of the first image units in the first pattern layer are multiplied to obtain the final image Finalpic. The matlab language may be expressed as follows:

Finalpic(:,:,1)=double(pixel(:,:,1))·*Grayprism;

Finalpic(:,:,2)=double(pixel(:,:,2))·*Grayprism;

Finalpic(:,:,3)=double(pixel(:,:,3))·*Grayprism;

Alternatively, the image data array of the first image units and the data array of the corresponding oblique view image units may be convolved in a spatial domain to obtain the first superimposed image.

In step S260, the first superimposed image is converted into a moire image.

The first superimposed image may be Fourier transformed, and filtered using a contrast sensitivity function according to the viewing distance and the viewing angle, and an inverse Fourier transform may be performed on the first superimposed image to obtain the moire image.

Figure 8:
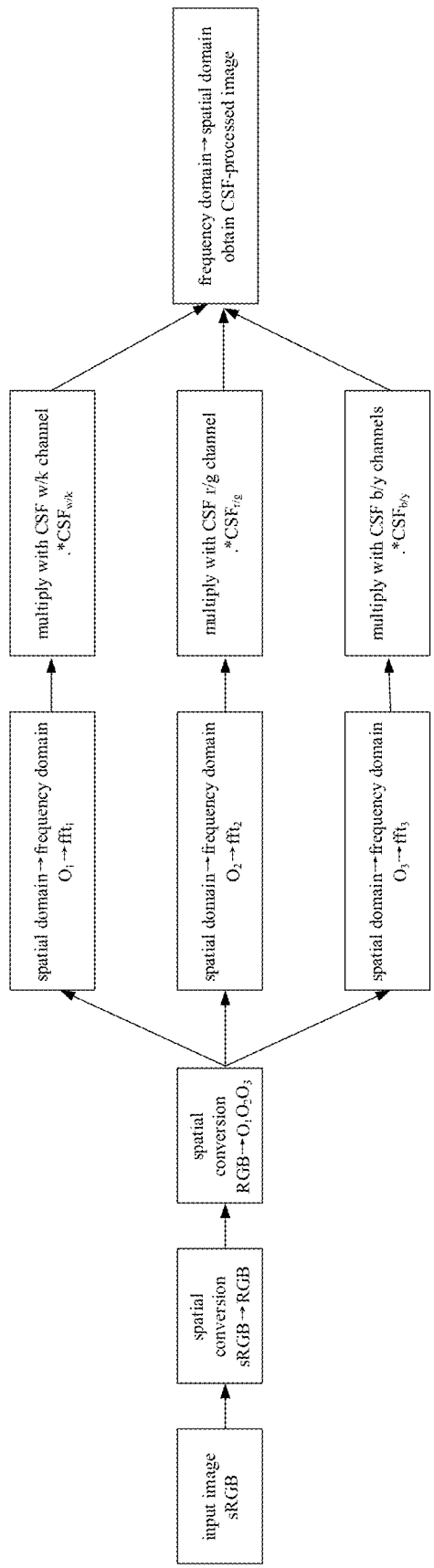
FIG. 8 is a schematic diagram showing superimposition of images according to an exemplary embodiment of the present disclosure.

For example, as shown in FIG. 8, the first superimposed image may be converted into a moire image in a manner of RGB multi-channel conversion. The sRGB data is first converted into RGB data, and then converted into three components, i.e., $O_1$, $O_2$, and $O_3$. Each component is converted from the spatial domain to the frequency domain, and is subjected to Fourier transform. Filtering is performed by multiplying each component with each channel of CSF. Moire images are obtained by inverse Fourier transform.

In step S270, the moire quantitative evaluation is performed according to the moire image.

Figure 7:
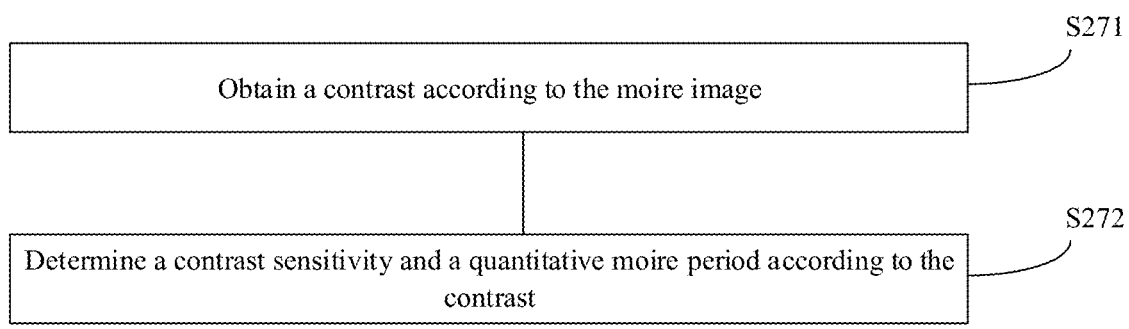
FIG. 7 is a flowchart of a moire quantitative evaluation method according to an exemplary embodiment of the present disclosure.

In an exemplary, as shown in FIG. 7, step S270 may include the following steps.

In step S271, a contrast is obtained according to the moire image.

Fourier transform may be performed on the moire image to determine the contrast. By performing Fourier transform, the moire image is transformed from the spatial domain to the frequency domain, and the contrast is calculated in the frequency domain, which may be calculated by the following formula:

$$D = \frac{2AC}{DC} \quad (4)$$

where D denotes the contrast, AC denotes the amplitude of each point after Fourier transform, and DC denotes the amplitude at the origin position after Fourier transform.

Alternatively, a maximum grayscale value and a minimum grayscale value of the moire image may be obtained;

and the contrast may be determined according to the maximum grayscale value and the minimum grayscale value. For example, $I_{MAX}$ and $I_{MIN}$ may be obtained by counting the grayscale of each point in the moire image.

The contrast may be calculated by the following formula:

$$D = \frac{I_{MAX} - I_{MIN}}{I_{MAX} + I_{MIN}} \quad (5)$$

where D denotes the contrast, $I_{MAX}$ denotes the maximum grayscale of the moire image, and $I_{Min}$ denotes the minimum grayscale of the moire image.

In step S272, a contrast sensitivity and a quantitative moire period is determined according to the contrast.

The contrast sensitivity may be obtained by calculating reciprocal of the contrast. The contrast and the contrast sensitivity function may be multiplied to obtain an effective contrast; and the moire period corresponding to the maximum effective contrast is selected as the quantized moire period.

Figure 9:
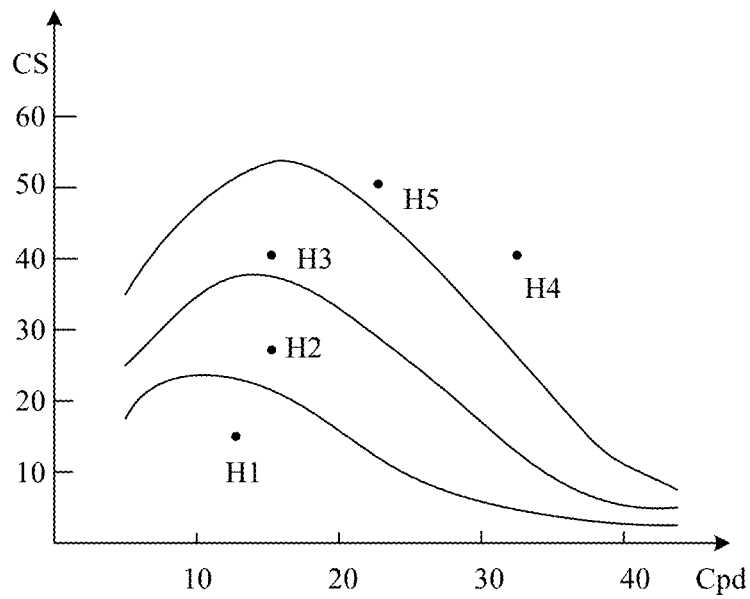
FIG. 9 is a schematic diagram showing a quantization result according to an exemplary embodiment of the present disclosure.

After determining the quantitative moire period and contrast sensitivity, the quantitative moire period and contrast sensitivity are identified in the CSF curve diagram. As shown in FIG. 9, in the CSF curve, the abscissa is the moire period Cpd (Cycle per degree), and the ordinate is the contrast sensitivity CS. In the CSF curve, the points above the CSF curve indicate that the moire of the display device is not obvious and the design meets the display requirements; the points below the CSF curve indicate that the moire of the display device is obvious and the design does not meet the display requirements.

In practical applications, the CSF curve diagram may include multiple curves depending on actual display requirements (degree of moire). The points above the multiple CSF curves represent that the moire of the display device is not obvious, and the design meets the display requirements. The points below the multiple CSF curves represent that the moire of the display device is obvious, and the design does not meet the display requirements. In FIG. 9, the prism angle corresponding to point H1 do not meet the display requirements, the prism angles corresponding to points H4 and H5 meet the display requirements, and the prism angles corresponding to points H2 and H3 are in an intermediate state, which may be used in some display devices.

Figure 10:
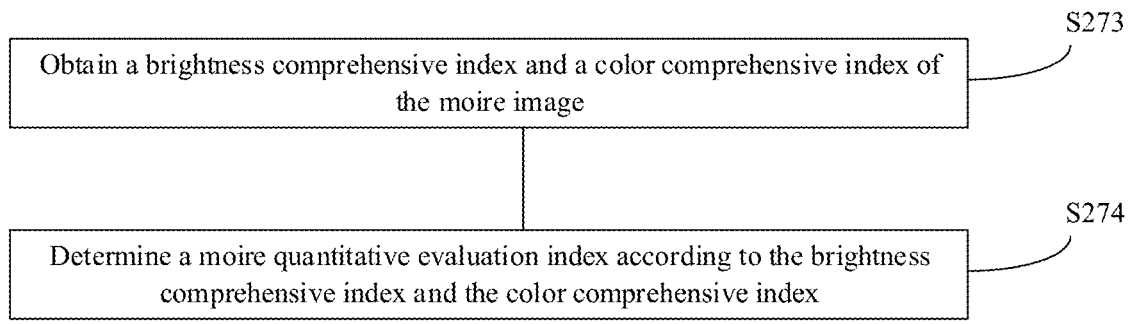
FIG. 10 is a flowchart of a moire quantitative evaluation method according to an exemplary embodiment of the present disclosure.

In an exemplary embodiment, as shown in FIG. 10, step S270 may include the following steps.

In step S273, a brightness comprehensive index and a color comprehensive index of the moire image are obtained.

The brightness comprehensive index and the color comprehensive index of the moire image may be obtained in a manner prescribed in the IEC TR-62977 standard. For example, the brightness comprehensive index may be calculated according to factors such as mura area, the difference between the maximum brightness value and the average brightness value, and the edge area; the color comprehensive index may be calculated by factors such as the mura area, the maximum color value, and the edge area.

In step S274, a moire quantitative evaluation index is determined according to the brightness comprehensive index and the color comprehensive index.

After obtaining the brightness comprehensive index and the color comprehensive index, the moire quantitative evaluation index may be obtained by the following formula:

$$Y_{gen} = 0.705'Y_{lum} + 0.634'Y_{col} \quad (6)$$

where $Y_{gen}$ denotes a moire quantitative evaluation index, $Y_{lum}$ denotes a brightness comprehensive index, and $Y_{col}$ denotes a brightness comprehensive index.

Figure 11:
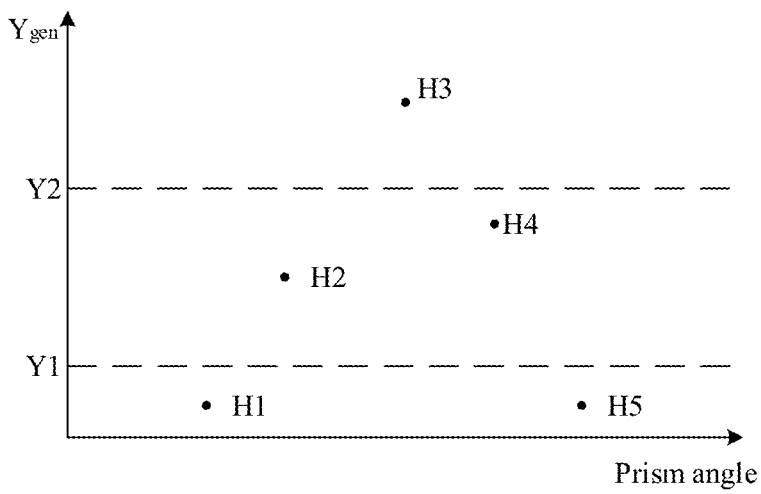
FIG. 11 is a schematic diagram showing a quantization result according to an exemplary embodiment of the present disclosure.

When the moire quantitative evaluation index is less than a first preset threshold, it can be considered that the design can meet the display requirements, and when the moire quantitative evaluation index is greater than a second preset threshold, it can be considered that the design cannot meet the display requirements. For example, as shown in FIG. 11, different angles of the prism film correspond to different positions on the graph, and the smaller the moire quantitative index is, the less obvious the moire will be. For example, points H1 and H5 meet the display requirements, and point H3 does not meet the display requirements.

Figure 12:
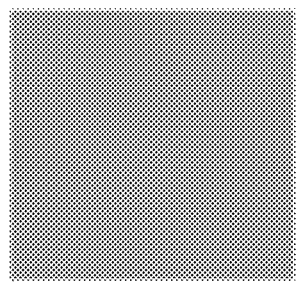
FIG. 12 is a schematic diagram showing displayed images of a display device from an orthographic viewing angle according to an exemplary embodiment of the present disclosure.
Figure 13:
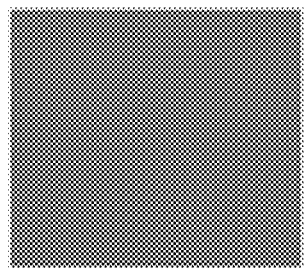
FIG. 13 is a schematic diagram of an orthographic view moire image according to an exemplary embodiment of the present disclosure.
Figure 14:
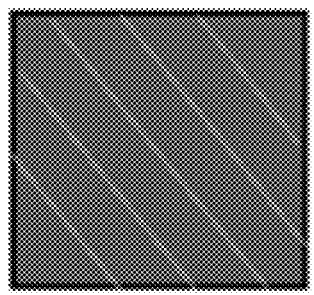
FIG. 14 is a schematic diagram showing displayed images of a display device from an oblique viewing angle according to an exemplary embodiment of the present disclosure.
Figure 15:
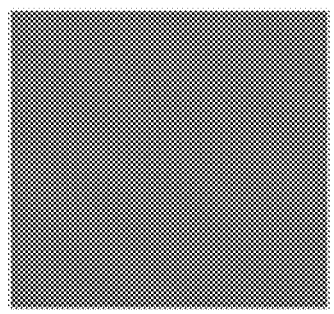
FIG. 15 is a schematic diagram of an oblique view moire image according to an exemplary embodiment of the present disclosure.

FIG. 12 shows actual displayed images of a display device in an orthographic viewing angle, and FIG. 13 is a quantitative evaluation moire image in the same case and the quantitative moire period and contrast sensitivity are both 0. FIG. 14 shows actual displayed images of a display device in an oblique viewing angle, and FIG. 15 is a quantitative evaluation moire image in the same case, and the quantitative moire period is 7 and contrast sensitivity is 1.6%. It can be seen that the quantitative evaluation result of the moire quantitative evaluation method provided by the embodiments of the present disclosure are consistent with actual display conditions, and may provide guidance for the design of display devices.

It should be noted that although steps in the above exemplary embodiments are described in a specific order, this does not require or imply that these steps must be performed in this specific order, or all steps must be performed to achieve the desired result. Additionally or alternatively, certain steps may be omitted, multiple steps may be combined into one step, and/or one step may be split into multiple steps, and so on.

Figure 16:
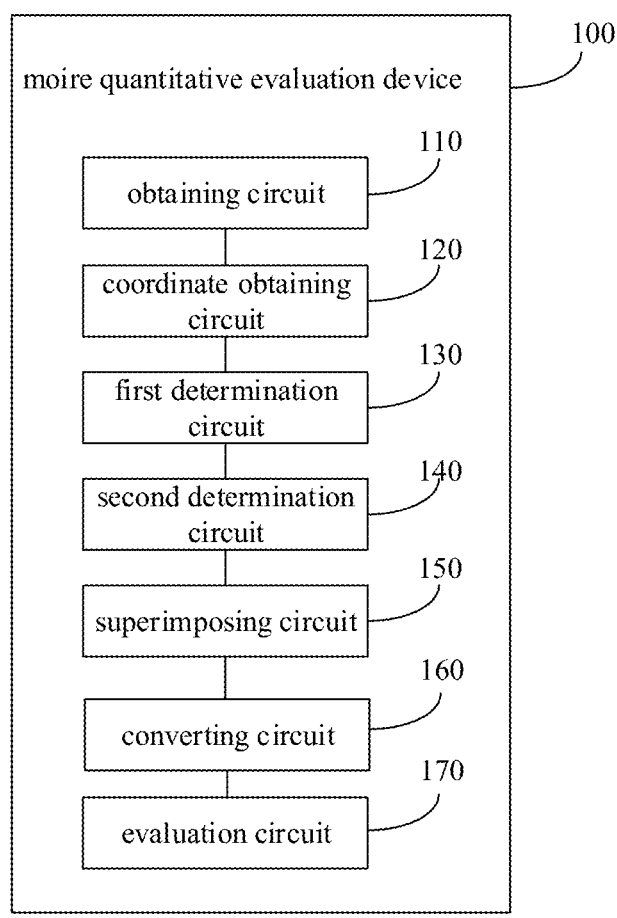
FIG. 16 is a block diagram of a moire quantitative evaluation device according to an exemplary embodiment of the present disclosure.

An exemplary embodiment of the present disclosure further provides a moire quantitative evaluation device. As shown in FIG. 16, the device 100 for quantitatively evaluating the moire includes an obtaining circuit 110, a coordinate obtaining circuit 120, a first determination circuit 130, a second determination circuit 140, a superimposing circuit 150, a converting circuit 160 and an evaluation circuit 170.

The obtaining circuit 110 is configured to obtain an image of a first pattern layer. The first pattern layer is located on a light-exiting side of a second pattern layer, the first pattern layer comprises first image units arranged periodically, and the second pattern layer comprises second image units arranged periodically.

The coordinate obtaining circuit 120 is configured to obtain coordinates of each of the first image units according to a viewing distance and an oblique viewing angle.

The first determination circuit 130 is configured to, according to the coordinates of each of the first image units and a thickness and a refractive index of a dielectric layer disposed between the first pattern layer and the second pattern layer, determine coordinates of projection image units on the second pattern layer each of which corresponds to a corresponding one of the first image units along an oblique view light path.

The second determination circuit 140 is configured to determine surrounding regions on the second pattern layer each of which surrounds one of the projection image units, and determining a pixel value of each of the projection image units according to pixel values of second image units in each of the surrounding regions to obtain an oblique view image.

The superimposing circuit 150 is configured to superimpose the image of the first pattern layer and the oblique view image to obtain a first superimposed image.

The converting circuit 160 is configured to convert the first superimposed image into a moire image.

The evaluation circuit 170 is configured to perform a moire quantitative evaluation according to the moire image.

The circuits 110 to 170 may be implemented by one or more processors, controllers, integrated circuits in conjunction with suitable software instructions. The one or more processors may include one or more hardware processors, as may be appreciated.

The specific details of each circuit of the device for quantitatively evaluating the moire described above have been described in detail in the corresponding method embodiments and repeated descriptions are omitted here.

It should be noted that although circuits of the device for quantitatively evaluating the moire are mentioned in the detailed description above, division of the circuits is not mandatory. Indeed, according to embodiments of the present disclosure, the features, and functions of two or more circuits described above may be embodied in one circuit. Alternatively, the features and functions of one of the circuits described above may be further divided into features and functions of a plurality of circuits.

Further, in an exemplary embodiment of the present disclosure, there is further provided an electronic device capable of implementing the above methods.

Those skilled in the art may understand that various aspects of the present disclosure may be implemented as a system, a method, or a program product. Therefore, various aspects of the present disclosure may be embodied completely by hardware implementation, completely by software (including firmware, microcode, etc.), or by a combination of hardware and software, which can be collectively referred to herein "circuit", "module", or "system".

An electronic device 400 according to an embodiment of the present disclosure is described below with reference to FIG. 17. The electronic device 400 shown in FIG. 17 is merely an example, and should not be construed as imposing any limitation on the functions and scope of use of the embodiments of the present disclosure.

Figure 17:
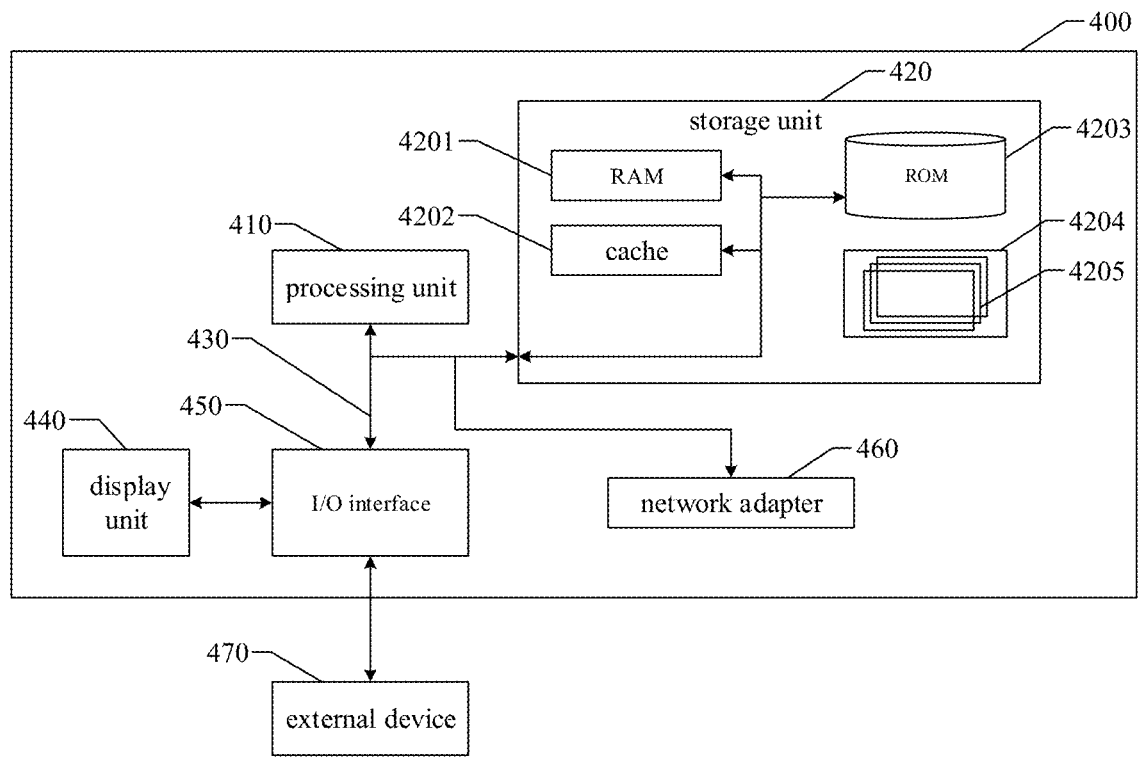
FIG. 17 is a schematic diagram of an electronic device according to an exemplary embodiment of the present disclosure.

As shown in FIG. 17, the electronic device 400 is in the form of a general-purpose computing device. The components of the electronic device 400 may include, but are not limited to, at least one processing unit 410, at least one storage unit 420, a bus 430 connecting different system components (including the storage unit 420 and the processing unit 410), and a display unit 440.

The storage unit stores program codes, and the program codes can be executed by the processing unit 410, so that the processing unit 410 executes steps of various exemplary embodiments of the present disclosure.

The storage unit 420 may include a readable medium in the form of a volatile storage unit, such as a random access storage unit (RAM) 4201 and/or a cache storage unit 4202, and may further include a read-only storage unit (ROM) 4203.

The storage unit 420 may also include a program/utility tool 4204 having a set (at least one) of program modules 4205. Such program modules 1725 include, but are not limited to, an operating system, one or more application programs, other program modules, and program data. Each or some combination of these examples may include an implementation of a network environment.

The bus 430 may be one or more of several kinds of bus structures, including a memory unit bus or a memory unit controller, a peripheral bus, a graphics acceleration port, a processing unit, or a local area bus using any of a variety of bus structures.

The electronic device 400 may also communicate with one or more external devices 470 (such as a keyboard, pointing device, Bluetooth device, etc.), and may also communicate with one or more devices that enable a user to interact with the electronic device 400, and/or with any device (e.g., router, modem, etc.) that enables the electronic device 400 to communicate with one or more other computing devices. This communication can be performed through an input/output (I/O) interface 450. Moreover, the electronic device 400 can also communicate with one or more networks (such as a local area network (LAN), a wide area network (WAN), and/or a public network such as the Internet) through the network adapter 460. As shown in this figure, the network adapter 440 communicates with other modules of the electronic device 400 through the bus 430. It should be understood that although not shown in the figure, other hardware and/or software modules may be used in conjunction with the electronic device 400, including but not limited to: microcode, device drivers, redundant processing units, external disk drive arrays, RAID systems, tape drives and data backup storage systems.

Through the description of the above embodiments, those skilled in the art can easily understand that the example embodiments described herein can be implemented by software, or by software in combination with necessary hardware. Therefore, the technical solution according to the embodiments of the present disclosure may be embodied in the form of a software product, which may be stored in a non-volatile storage medium (which may be a CD-ROM, a U disk, a mobile hard disk, etc.) or on a network, and may include instructions to cause a computing device (which may be a personal computer, a server, a terminal device, or a network device, etc.) to execute methods according to embodiments of the present disclosure.

In an exemplary embodiment of the present disclosure, there is also provided a computer-readable storage medium on which a program product capable of implementing the above-mentioned methods of the present specification is stored. In some possible embodiments, various aspects of the present disclosure may also be implemented in the form of a program product, which includes program codes. When the program products are run on a terminal device, the program codes are used to make the terminal device perform the steps according to various exemplary embodiments of the present disclosure.

Figure 18:
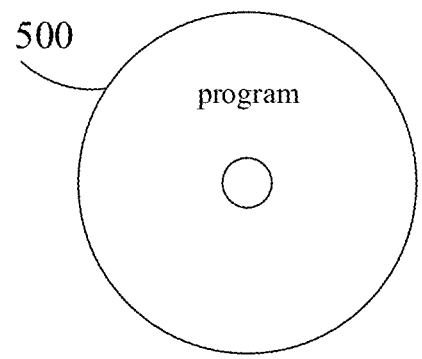
FIG. 18 is a schematic diagram of a computer-readable storage medium according to an exemplary embodiment of the present disclosure.

Referring to FIG. 18, a program product 500 for implementing the above methods according to embodiments of the disclosure is described, which may adopt a portable compact disc read-only memory (CD-ROM) and include program codes. The program product may be stored in a terminal device and run on a personal computer. However, the program product of the present disclosure is not limited thereto. The non-transitory computer-readable storage medium may be any tangible medium containing or storing programs, and the programs may be used by an instruction execution system, apparatus, or device, or may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of the readable storage media include: an electrical connection with one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The computer-readable signal medium may include a data signal in baseband or propagated as part of a carrier wave, in which a readable program code is carried. This propagated data signal can take many forms, including but not limited to electromagnetic signals, optical signals, or any suitable combination of the foregoing. The readable signal medium may also be any readable medium other than a readable storage medium, and the readable medium may send, transfer, or transmit a program for use by or in connection with an instruction execution system, apparatus, or device.

The program code contained on the readable storage medium may be transmitted using any appropriate medium, including but not limited to wireless, wired, optical fiber cable, RF, etc., or any suitable combination of the foregoing.

The program code for performing the operations of the present disclosure may be written in any combination of one or more programming languages, which include object-oriented programming languages, such as Java, C++, etc. and also include conventional procedural programming language, such as "C" or a similar programming language. The program code can be executed entirely on the user computing device, partly on the user device, executed as an independent software package, executed partly on the user computing device and partly on the remote computing device, or executed entirely on the remote computing device or server. In the case of a remote computing device, the remote computing device can be connected to the user computing device through any kind of network, including a local area network (LAN) or a wide area network (WAN), or may be connected to an external computing device (for example, using an Internet service provider to connect through the Internet).

In addition, the above-mentioned drawings show exemplary embodiments of the present disclosure, and the present disclosure is not limited to the exemplary embodiments shown in the drawings. It is readily apparent that the processes shown in the above drawings do not indicate chronological order of these processes. In addition, it is readily apparent that these processes can be performed synchronously or asynchronously in multiple modules.

Other embodiments of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope of the present disclosure is defined by the appended claims.

It should be understood that the present disclosure is not limited to the exact structures that have been described above and illustrated in the accompanying drawings, and various modifications and changes may be made without departing from the scope of the present disclosure. The scope of the disclosure is defined only by the appended claims.

What is claimed is:

1. A moire quantitative evaluation method, comprising:
   obtaining an image of a first pattern layer, wherein the first pattern layer is located on a light-exiting side of a second pattern layer, the first pattern layer comprises first image units arranged periodically, and the second pattern layer comprises second image units arranged periodically;
   obtaining coordinates of each of the first image units according to a viewing distance and an oblique viewing angle;
   according to the coordinates of each of the first image units and a thickness and a refractive index of a dielectric layer disposed between the first pattern layer and the second pattern layer, determining coordinates of projection image units on the second pattern layer each of which corresponds to a corresponding one of the first image units along an oblique view light path;
   determining surrounding regions on the second pattern layer each of which surrounds one of the projection image units, and determining a pixel value of each of the projection image units according to pixel values of second image units in each of the surrounding regions to obtain an oblique view image by:
      determining second image units adjacent to each of the projection image units on the second pattern layer which corresponds to a corresponding one of the first image units, and determining regions formed by the second image units as the surrounding regions;
      performing interpolation on pixel values of the second image units in each of the surrounding regions to obtaining the pixel value of each of the projection image units; and
      obtaining the oblique view image based on the pixel values of the projection image units;
   superimposing the image of the first pattern layer and the oblique view image to obtain a first superimposed image by:
      converting the oblique view image to a grayscale image; and
      multiplying image data of the converted grayscale image and image data of the image of the first pattern layer to obtain the first superimposed image;
   converting the first superimposed image into a moire image; and
   performing a moire quantitative evaluation according to the moire image.

2. The moire quantitative evaluation method according to claim 1, wherein performing interpolation on pixel values of the second image units in each of the surrounding regions to obtaining the pixel value of each of the projection image units comprises:
   determining distances of each of the projection image units from edges of a surrounding region which corresponds to the projection image unit, and performing interpolation on pixel values of the second image units in the surrounding region based on the distances to obtain the pixel value of each of the projection image units.

3. The moire quantitative evaluation method according to claim 1, wherein converting the first superimposed image into the moire image comprises:
   performing Fourier transform on the first superimposed image, performing filtering with a contrast sensitivity function according to the viewing distance and the oblique viewing angle, and performing inverse Fourier transform to obtain the moire image.

4. The moire quantitative evaluation method according to claim 1, wherein performing the moire quantitative evaluation according to the moire image comprises:
obtaining a contrast according to the moire image; and
determining a contrast sensitivity and a quantitative moire period according to the contrast.

5. The moire quantitative evaluation method according to claim 4, wherein obtaining a contrast according to the moire image comprises performing Fourier transform on the moire image to determine the contrast.

6. The moire quantitative evaluation method according to claim 4, wherein obtaining a contrast according to the moire image comprises:
obtaining a maximum grayscale value and a minimum grayscale value of the moire image; and
determining the contrast according to the maximum grayscale value and the minimum grayscale value.

7. The moire quantitative evaluation method according to claim 4, wherein determining the contrast sensitivity and the quantitative moire period according to the contrast comprises:
obtaining the contrast sensitivity by calculating a reciprocal of the contrast;
multiplying the contrast and a contrast sensitivity function to obtain an effective contrast; and
selecting a moire period corresponding to a maximum effective contrast as the quantitative moire period.

8. The moire quantitative evaluation method according to claim 1, wherein performing the moire quantitative evaluation according to the moire image comprises:
obtaining a brightness comprehensive index and a color comprehensive index of the moire image; and
determining a moire quantitative evaluation index according to the brightness comprehensive index and the color comprehensive index.

9. A moire quantitative evaluation device, comprising:
an obtaining circuit configured to obtain an image of a first pattern layer, wherein the first pattern layer is located on a light-exiting side of a second pattern layer, the first pattern layer comprises first image units arranged periodically, and the second pattern layer comprises second image units arranged periodically;
a coordinate obtaining circuit configured to obtain coordinates of each of the first image units according to a viewing distance and an oblique viewing angle;
a first determination circuit configured to, according to the coordinates of each of the first image units and a thickness and a refractive index of a dielectric layer disposed between the first pattern layer and the second pattern layer, determine coordinates of projection image units on the second pattern layer each of which corresponds to a corresponding one of the first image units along an oblique view light path;
a second determination circuit configured to determine surrounding regions on the second pattern layer each of which surrounds one of the projection image units, and determining a pixel value of each of the projection image units according to pixel values of second image units in each of the surrounding regions to obtain an oblique view image, wherein the second determination circuit is further configured to:
determine second image units adjacent to each of the projection image units on the second pattern layer which corresponds to a corresponding one of the first image units, and determine regions formed by the second image units as the surrounding regions;
perform interpolation on pixel values of the second image units in each of the surrounding regions to obtaining the pixel value of each of the projection image units; and
obtain the oblique view image based on the pixel values of the projection image units;
a superimposing circuit configured to superimpose the image of the first pattern layer and the oblique view image to obtain a first superimposed image, wherein the superimposing circuit is further configured to:
convert the oblique view image to a grayscale image; and
multiply image data of the converted grayscale image and image data of the image of the first pattern layer to obtain the first superimposed image;
a converting circuit configured to convert the first superimposed image into a moire image; and
an evaluation circuit configured to perform a moire quantitative evaluation according to the moire image.

10. An electronic device, comprising:
at least one hardware processor; and
computer-readable instructions stored in memory and executable by the at least one hardware processor that, when executed by the at least one hardware processor, direct the at least one hardware processor to:
obtain an image of a first pattern layer, wherein the first pattern layer is located on a light-exiting side of a second pattern layer, the first pattern layer comprises first image units arranged periodically, and the second pattern layer comprises second image units arranged periodically;
obtain coordinates of each of the first image units according to a viewing distance and an oblique viewing angle;
according to the coordinates of each of the first image units and a thickness and a refractive index of a dielectric layer disposed between the first pattern layer and the second pattern layer, determine coordinates of projection image units on the second pattern layer each of which corresponds to a corresponding one of the first image units along an oblique view light path;
determine surrounding regions on the second pattern layer each of which surrounds one of the projection image units, and determining a pixel value of each of the projection image units according to pixel values of second image units in each of the surrounding regions to obtain an oblique view image by:
determining second image units adjacent to each of the projection image units on the second pattern layer which corresponds to a corresponding one of the first image units, and determining regions formed by the second image units as the surrounding regions;
performing interpolation on pixel values of the second image units in each of the surrounding regions to obtaining the pixel value of each of the projection image units; and
obtaining the oblique view image based on the pixel values of the projection image units;
superimpose the image of the first pattern layer and the oblique view image to obtain a first superimposed image by:
converting the oblique view image to a grayscale image; and multiplying image data of the converted grayscale image and image data of the image of the first pattern layer to obtain the first superimposed image;

convert the first superimposed image into a moire image; and perform a moire quantitative evaluation according to the moire image.

11. The device according to claim 10, wherein the at least one hardware processor is further directed to:

determine distances of each of the projection image units from edges of a surrounding region which corresponds to the projection image unit, and performing interpolation on pixel values of the second image units in the surrounding region based on the distances to obtain the pixel value of each of the projection image units.

12. The device according to claim 10, wherein the at least one hardware processor is further directed to perform Fourier transform on the first superimposed image, perform filtering with a contrast sensitivity function according to the viewing distance and the oblique viewing angle, and perform inverse Fourier transform to obtain the moire image.

13. The device according to claim 10, wherein the at least one hardware processor is further directed to:

obtain a contrast according to the moire image; and determine a contrast sensitivity and a quantitative moire period according to the contrast.

14. The device according to claim 13, wherein the at least one hardware processor is further directed to perform Fourier transform on the moire image to determine the contrast.

15. The device according to claim 13, wherein the at least one hardware processor is further directed to:

obtain a maximum grayscale value and a minimum grayscale value of the moire image; and determine the contrast according to the maximum grayscale value and the minimum grayscale value.

16. A non-transitory computer-readable storage medium having stored thereon a computer program that, when executed by at least one hardware processor, directs the at least one hardware processor to implement the method according to claim 1.

* * * * *